Figure 1:
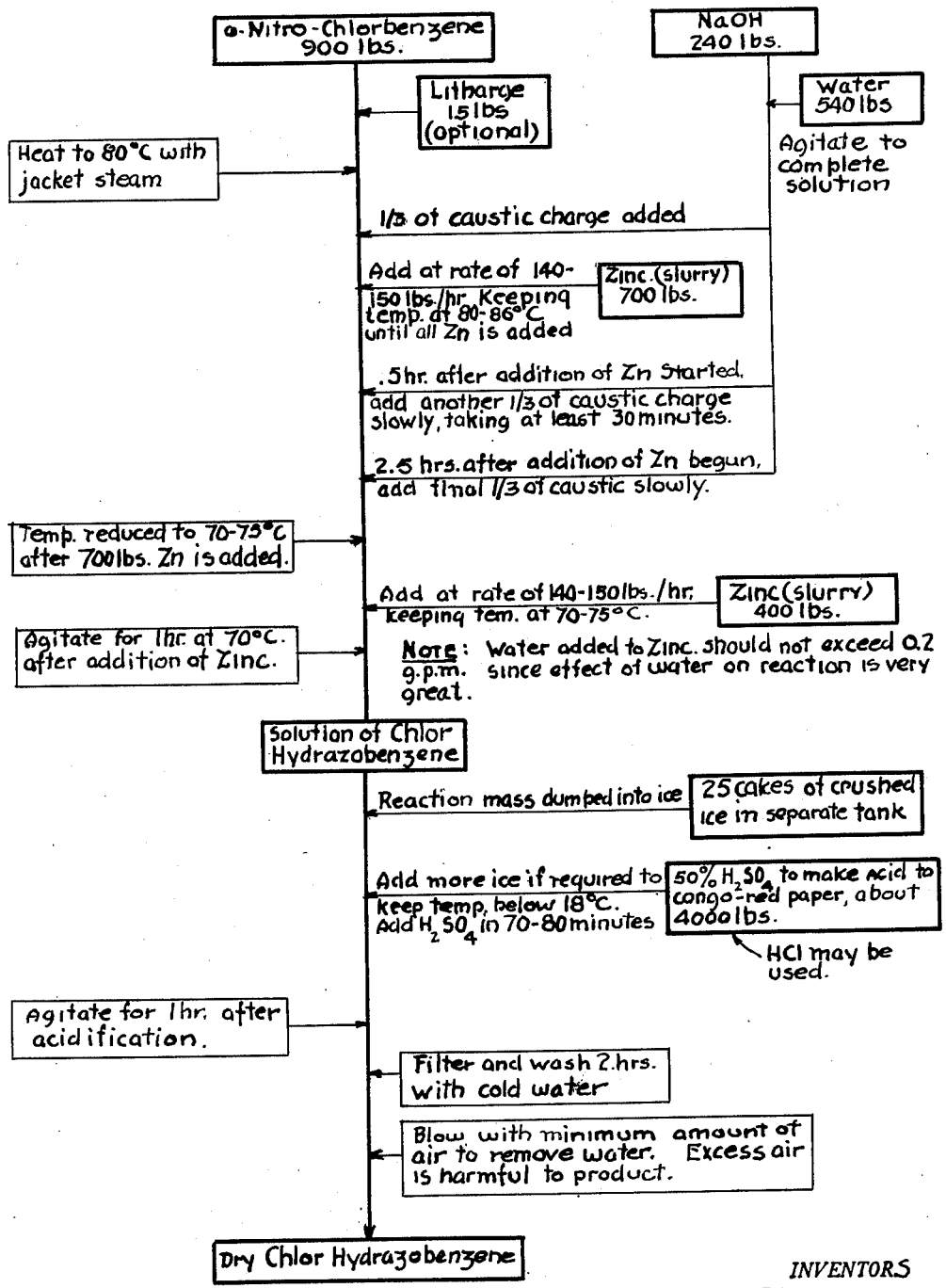

INVENTORS
MARTIN D. FARKAS AND
BY JEROME DEICH

Robert A. Sturges
ATTORNEY

May 26, 1953     M. D. FARKAS ET AL     2,640,081
PROCESS FOR MANUFACTURING BENZIDINE TYPE COMPOUNDS
Filed Oct. 4, 1949     2 Sheets-Sheet 2

INVENTORS
MARTIN D. FARKAS and
BY JEROME DEICH
Robert A. Sturges
ATTORNEY

Patented May 26, 1953

2,640,081

UNITED STATES PATENT OFFICE 2,640,081

PROCESS FOR MANUFACTURING BENZIDINE TYPE COMPOUNDS

Martin Donald Farkas, Chicago, and Jerome Deich, Harvey, Ill., assignors to The Sherwin-Williams Company, Cleveland, Ohio, a corporation of Ohio Application October 4, 1949, Serial No. 119,436

13 Claims. (Cl. 260—578)

This invention relates to an improved process for the production of compounds of the benzidine type from nitro-substituted aromatic compounds. More particularly, the invention is concerned with production of this type of material from halogen-containing nitro aromatic compounds.

The halogen-containing compounds, as well as those which are halogen-free, of the benzidine series are widely used as intermediates in the production of pigmentary materials. For this reason it is desirable that these important products be produced in relatively large quantities with a relatively high degree of purity. While it has been possible in the laboratory to produce benzidine type compounds of high purity, when the process is converted over to semi-plant scale, certain factors not encountered in the laboratory work enter into the process and result in products having an inferior degree of purity. Unless the products are of high purity, pigmentary materials produced therefrom lack uniformity from one batch to the next, and also yield a pigment of untrue color, generally referred to as a "muddy" color.

Numerous methods have been suggested by the prior art for the production of benzidine compounds, many of these being directed to methods of improving the purity. Thus the problem is not a new one, and where economy and ease of handling are desired, has not heretofore been satisfactorily solved. Among these are the use of special catalysts such as ferrous sulphide in neutral or alkaline media, the use of alcohol as the solvent medium, and the manufacture of such materials by hydrogenation processes. The prior art patents of interest in the manufacture of benzidine compounds include the patents to Nelson 1,633,123, 1,644,483, 1,718,373; the patent to Dieterle 1,689,014; the patent to Lubbs et al. 1,884,776; the patent to Richards 2,120,811; and the recent patent to Kamlet 2,464,044.

One of the principal difficulties in large scale production of benzidine type compounds from nitro-substituted aromatic compounds is that in the crystallization of the aromatic hydrazo compound from the initial reaction mass, the crystals have a tendency to form slowly thereby occluding within the crystal structure various particles of impurities which interfere with the color characteristics of a pigment produced from the rearranged product. These impurities are carried on through the rearrangement of the hydrazo compound to the benzidine type material. Because of the large size of hydrazo crystals formed in the processes heretofore employed in the manufacture of this type of material, it is believed that in the rearrangement step a layer of benzidine type material is produced on the surface of such crystal which protects the inner portion of the crystal from further action by the rearrangement medium. This phenomenon also contributes to the production of pigments having a "muddy" color.

It should also be noted that rearrangement steps heretofore carried out have been done in the presence of an organic solvent. In our improved process, we are able to eliminate the requisite storage, addition, handling, and recovery of large volumes of solvent.

It is a principal object of our invention, therefore, to provide a process for the manufacture of benzidine type materials from nitro-substituted aromatic compounds which may or may not contain in addition to the nitro substituent one or more halogen substituents, which process obviates the difficulties encountered in the prior art processes both from a process and from a chemical standpoint.

Another object of our invention is the elimination of the need for solvent in the rearrangement step.

Other objects of our invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Broadly stated this invention is concerned with a process for the manufacture of compounds of the benzidine series, said process comprising the steps of reducing a nitro-substituted aromatic ring compound in the presence of hydrogen and an aqueous solution of an alkali metal hydroxide at a temperature of from about 65° C. to about 100° C., and preferably from about 70° C. to 80° C., shock-cooling the reaction mass to a temperature below about 20° C. and preferably below 18° C., substantially neutralizing the reaction mass with a mineral acid, separating the hydrazo aromatic product; and thereafter rearranging said product in the presence of a mineral acid at a temperature of from about 20° C. to about 90° C., and preferably from 60° C. to 70° C., diluting the rearranged mass with from about 1 to about 10 volumes of water and recovering the rearranged product therefrom. We have found that the inclusion of the step of "shock-cooling" the aromatic hydrazo compound after the reduction step results in the production of very fine crystals which are free from any occluded impurities and are readily washed free of other reaction materials. Moreover, the small size of such crystals prevents the building up of an impervious layer on the surface of the crystal so that the entire crystal becomes rearranged into a benzidine type material.

In the annexed drawings we have illustrated a diagrammatic flow sheet of one form of a process utilizing the shock-cooling step.

Fig. 1 illustrates a process by which the hydrazo aromatic compound is produced.

Figure 2:
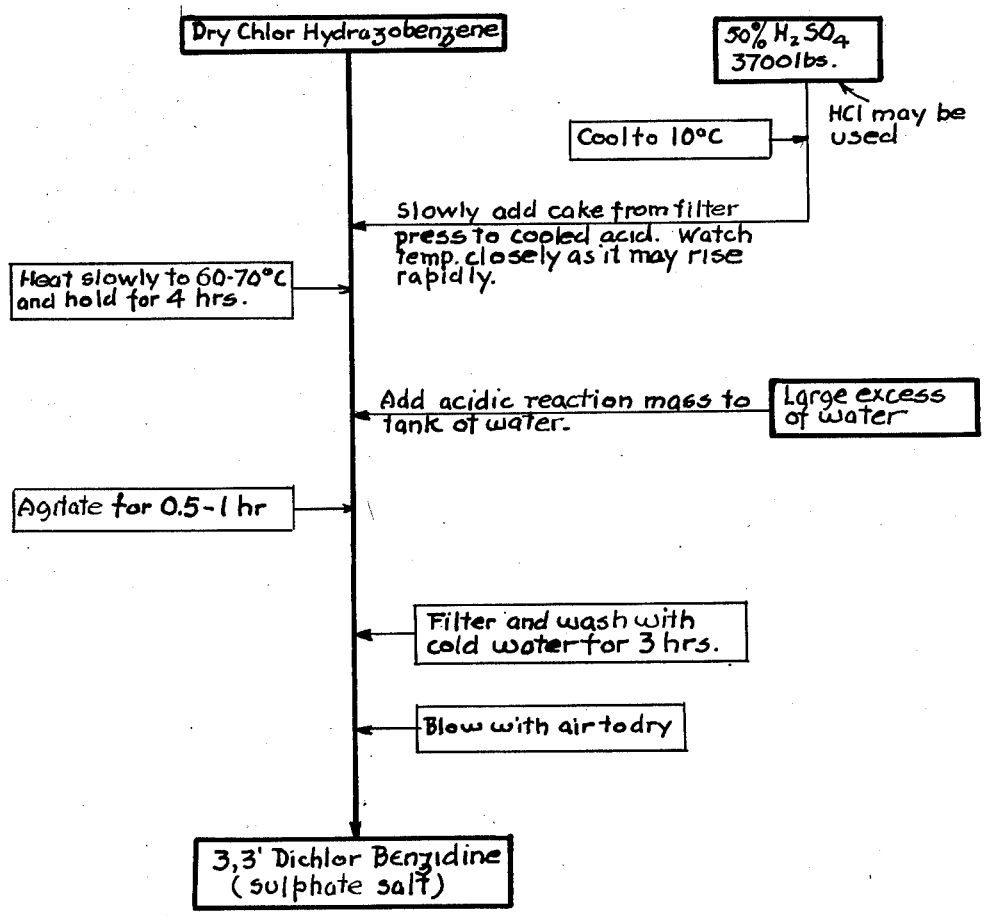

Fig. 2 diagrams the procedure for rearranging the hydrazo aromatic compound to the benzidine type compound.

While these drawings are believed to be self-explanatory, a more detailed description of the process illustrated therein will be made at a later point in the specification.

In general, the starting materials for this process are aromatic compounds having a nuclear substituted nitro (NO₂) group. A preferred class of such compounds is that having the general formula:

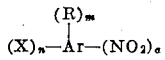

wherein Ar is an aromatic nucleus, such as phenyl, naphthyl, diphenyl, diphenyl ether, etc.; R is selected from hydrogen and aliphatic radicals, such as alkyl, alkoxy, haloalkyl, etc.; and X is halogen; and $m$ and $n$ are each selected from zero and a small whole number from 1 to the number of available replaceable hydrogen atoms on the aromatic nucleus less at least one, and further, less the value of $a$ which is at least 1. As the para position to the nitro group must be open to accommodate the later benzidine rearrangement, the total of $m$ plus $n$ plus $a$ cannot be greater than 5 where Ar is a benzene ring, or greater than 7 where Ar is a naphthalene ring. Accordingly $a$ will be at least 1 and not more than 3 where Ar is a benzene nucleus, and at least 1 and theoretically not more than 7 where Ar is a naphthalene ring. Of course, the greater the value of $a$, the more dangerous the material becomes in handling and for practical purposes a value of $a$ of 1 or 2 regardless of the structure of Ar is preferred. Although the radical X in the above formula may be chlorine, bromine, fluorine, or iodine, or a plurality of different halogen atoms, we prefer to use those compounds in which X is chlorine for the reason that it is readily available and generally cheaper than the other halogens. In certain instances, the halogen, if present, may be attached to a carbon atom of the radical R, although best results have been most consistently obtained with halogen-containing compounds wherein the halogen is attached directly to a carbon atom of an aromatic ring structure. Suitable examples of starting materials thus available for use in our process include nitrobenzene, o-nitrochlorbenzene, o-nitro-brombenzene, m-nitrochlorbenzene, 2,4-dichlor-6-nitrobenzene, o-nitrotoluene, m-nitrotoluene, m-methoxy nitrobenzene, o-ethoxy nitrobenzene, o-methoxy nitrobenzene, m-ethoxy nitrobenzene, o-phenoxy nitrobenzene, m-phenoxy nitrobenzene, o-phenyl nitrobenzene, nitronaphthalene, alpha methyl alpha'-nitro-napthalene, alpha methoxy alpha'-nitro-naphthalene, 1-nitro-2,8-dichlornaphthalene, 1-nitro-2,8-dichlor-7-methyl naphthalene, o-pentachlorphenyl nitrobenzene, o-sym. trimethylphenyl nitrobenzene, omega chloramyl-o-nitro-benzene, meta-dinitrobenzene, 2,4-dinitrochlorbenzene, and the like.

The reduction commonly employed in our improved process is effected through the interaction of finely divided zinc with an aqueous solution of an alkali metal hydroxide to produce hydrogen in situ. Alternatively, we may employ hydrogen gas under pressure in the presence of a reducing catalyst such as Raney nickel, palladium and platinum.

As indicated in Fig. 1 of the annexed drawing, there may also be used in conjunction with the powdered zinc, or other such hydrogen producing metal, a heavy metal oxide such as litharge in relatively small amount although this has been found not to be a requirement of the process. Zinc oxide may be used in like manner. We have found that where zinc is used alone, there is what may be termed an induction period of rather indefinite duration which precedes the reduction reaction. If care is not observed in the addition of the zinc to the reaction mass, there may be an excess of zinc present at the termination of the induction period with the result that the reaction may become uncontrollable. However, when litharge or other such heavy metal oxide is preliminarily introduced into the reaction mass, the induction period is greatly reduced and the reaction proceeds almost instantaneously.

The aqueous solution of an alkali metal hydroxide employed in conjunction with the catalytic material to effect the reduction of the nitro compound may be approximately 20% to about 50% water solution of an alkali metal hydroxide such as sodium, potassium, and lithium hydroxides.

In the preferred embodiment of our invention, powdered zinc and the alkali metal hydroxide solution are added to the starting material which has been heated to from about 65° C. to about 100° C. preferably about 80° C. in stagewise fashion, the first portion of the powdered metal being added at a continuous rate of about 20% by weight per hour after the first portion of the caustic solution has been added to the nitro aromatic compound. Thereafter at spaced intervals during the addition of the powdered metal, the remaining portions of the caustic solution are slowly added to the reaction mass. This provides fresh caustic and fresh metal continuously during the reduction stage of the reaction. After the caustic has been added, an additional amount of the zinc is added at the same rate at a somewhat reduced reaction temperature. The first portion of the powdered metal is roughly about 7 parts out of a total of 11 parts of the metal to be added. Thus after the final addition of caustic, there remain about 4 parts of powdered metal to be added at the reduced temperature. Generally it is best to add the powdered metal in the form of a water slurry, i. e. about a 50% to 80% slurry, the amount of such water being carefully controlled so as not to exceed 0.2 gallon per minute, or stated in another way the slurry consists of about .2 gallon of water per 2.4 lbs. of powdered zinc. It should be borne in mind, however, that the use of any water at all is not mandatory, but if water is used to facilitate handling, the amount should be limited to within the amount mentioned above, because undue dilution of the caustic in the initial stages of the reaction has been found to adversely affect the yield and quality of the final product.

It becomes convenient at this point to illustrate more specifically a preferred embodiment of our process by specific example, using as a starting material o-nitrochlorbenzene. This example is illustrated in Figs. 1 and 2 of the annexed drawing and is intended to be in supplement to and a more detailed explanation of such drawings.

540 lbs. of water are charged into a suitable vat, and 240 lbs. of sodium hydroxide, or other suitable alkali metal hydroxide are added and agitated to complete solution. In a separate vessel, 900 lbs. of ortho-nitrochlorbenzene or chemically equivalent amount of other nitro aromatic compound and optionally, 15 lbs. of litharge are charged and heated to 80° C. with jacket steam. One third of the caustic charge from the previous vat is added to the 900 lbs. of ortho-nitrochlorbenzene. Powdered zinc is added to this mixture at the rate of 140 to 150 lbs. per hour maintaining the temperature at 80–85° C. until 700 lbs. of zinc has been added as a water slurry. The amount of water added to the zinc slurry pot should be carefully controlled so as not to exceed 0.2 gallon per minute as read on a rotameter. The effect of water on the reaction is very great and must be watched carefully.

One-half hour after the addition of zinc is started, a second third of the caustic solution is added to the reaction mass. This addition must be very slow, the addition time being no less than ½ hour. 2½ hours after the beginning of the zinc addition, the final third of the caustic solution is added slowly. After 700 lbs. of zinc has been added, the temperature is reduced to about 70–75° C. and an additional 400 lbs. of zinc is added at the same rate as previously, namely 140 to 150 lbs. per hour while maintaining the temperature at this slightly reduced figure.

The reaction mass is agitated for 1 hour at 70° C. after the completion of the addition of the zinc.

In a third vessel, with the aid of an ice slinger, are placed 10,000 lbs. (twenty-five 400 lb. cakes) of finely divided ice. This ice must be charged to this vessel before the contents of the reaction vessel are pumped over. The hot reaction mixture is then rapidly pumped over to the ice containing vessel from the reaction chamber. Over a period of 70 to 80 minutes, sufficient 50% sulphuric acid, or hydrochloric acid, to make the solution test blue with Congo red paper is added. This amount is generally about 4,000 lbs. of 50% sulphuric acid. It is necessary to have adequate agitation of the mass during neutralization to prevent local overheating, and possible conversion due to the presence of unreacted zinc to chloraniline which imparts a greenish or "muddy" color to the final product. More ice is added to the neutralization mass if necessary to maintain the temperature below about 18° C. After acidification, the batch is agitated for a period of about 1 hour and thereafter pumped through a filter press. The residue is washed for about 1 hour with cold water and then blown with a minimum amount of air to remove the water. Excess air is harmful to the product in that the product is readily susceptible to oxidation the more nearly it approaches dryness. The filter press is then discharged.

In the annexed drawing the reaction product is identified as dry chlor-hydrazobenzene, although this press cake may contain as much as 20 to 30% of water.

By the term "shock-cooling" as used herein and in the appended claims is meant rapidly contacting the hot reaction mixture with ice to suddenly reduce the temperature of the reaction mass from at least about 70° C. to below about 18° C.–20° C. It should be pointed out that the quenching in ice must be done with the reaction mixture at a temperature of about 70 to 80° C. as temperatures below about 70° C. on quenching yield a product of larger crystal structure which is undesirable for the reasons pointed out above. At temperatures above about 70° C., the only observed difference is in the amount of ice which is required to reduce the temperature to below about 18° C.–20° C. Thus it is also quite important that the reduction mass be quenched before the temperature drops below about 70° C. as may occur if the reaction mass is allowed to stand for an undue period of time prior to the shock-cooling or quenching step.

3700 lbs. of 50% sulphuric acid are charged to a vessel and cooled by suitable means to a temperature of 10° C. The filter cake from the press is slowly added to the cool acid. The temperature must be very carefully watched for it may rise rapidly during the addition of the cake. When the temperature stops rising, the mass is slowly heated to bring the temperature to 60–70° C. at which point it is maintained for about 4 hours. If, originally, the temperature does not rise, heat is applied to slowly increase the temperature to 60–70° C. and the procedure above indicated followed. A 6,000 gallon tank is filled three-fourths full of water and the product from the rearrangement vessel pumped into the water tank and agitated for a period of about ½ to 1 hour. This slurry is then pumped to a second filter press, washed with cold water for about 1 to 3 or 4 hours and again blown with air to remove water.

The discharge from this filter press is the product and may be identified as 3,3' dichlorbenzidine in the form of the sulphate salt, or the hydrochloride depending upon which acid was used to effect the rearrangement, the usual free base content being about 30% to 50%, the balance comprising water and mineral acid.

Of course, it is clear that certain modifications in the process may be made without substantially departing from the spirit of this invention, the foregoing example being illustrative of but a single preferred embodiment of a procedure for producing benzidine type compounds of high purity in substantially commercial quantities. For example, instead of the preferred stagewise addition of alkali metal hydroxide, the caustic solution may be admitted continuously during the reduction reaction, or may, still less desirably, be completely charged prior to the addition of any metallic catalyst. The same is true for the finely divided metal.

As a result of plant and laboratory studies, various benzidine type compounds can now be made economically with an improved average yield and of a quality and purity superior to currently available products. The factors contributing most to this successful operation include the following:

(a) the production of very fine hydrazo crystals more adaptable to rearrangement and free of occluded impurities through the shock-cooling step substantially as described above;
(b) the adjustment of the alkali concentration in the reduction stage to correspond to optimum laboratory conditions through the addition of fresh aliquot portions periodically over the course of the reduction reaction; and (c) decreasing the reduction period by almost 50% thereby minimizing the likelihood of decomposition.

One of the most important differences which we have found to exist between laboratory and plant procedures is the comparative crystal structures of the hydrazo cake and of the relative behavior of plant prepared and laboratory prepared hydrazo cakes on rearrangement. Before the inclusion of the shock-cooling step, the plant prepared hydrazo cake contained very large crystals, some of which came through the rearrangement as black specks in the otherwise uniform press cake. In the laboratory, however, the press cake was invariably composed of fine crystals. In addition, the laboratory rearrangement of the laboratory prepared hydrazo cake appeared as a highly exothermic reaction, whereas plant material rearranged in the laboratory did not display as exothermic a reaction. Moreover, this latter product contained the black specks that characterized the plant product, but they did not appear in the laboratory prepared material. It was assumed that these particles were unrearranged hydrazo crystals which were inactive by virtue of their size or by being coated with an impervious layer of the benzidine type material. A close study of the plant technique as compared with that of the laboratory showed one startling difference. Because of the shift changes, the original plant procedure was so set up that when the reduction was completed, the batch was allowed to cool slowly in the reduction vessel and was then pumped into ice for the acidification. In the laboratory, on the other hand, the batch was quenched immediately after the reduction was completed. The plant procedure, therefore, allowed for the formation of crystals which were large because of the time over which that formation was allowed to take place. Therefore, the shock-cooling step was added to the plant procedure and proved entirely successful.

One curious effect has been noted in the source of the zinc employed to effect the reduction reaction. Zinc from one source caused some difficulty in that the reaction would commence normally, but "dead spots" would occur, i. e. the reaction would cease, as evidenced by the lack of exothermic activity. This condition would prevail for a few minutes, and then the reaction would suddenly reinitiate with such violence as to make control very difficult. Zinc from another source did not display this tendency to the same degree. Upon laboratory investigation it was found that although better yields were obtained using the latter source, the color obtained from the intermediate made with the former source was superior. However, it was found on further investigation that good yields could be obtained with the second source and by careful control the color obtained from the intermediate was equal to the standard. Further, this zinc was more reactive and the reaction showed no tendency for dead spots.

The feature of shock-cooling the reaction mass after the reduction reaction has been substantially completed has been found to be applicable not only to the production of 3,3'-dichloro-benzidine but also to such related, or benzidine type compounds as the tolidines, the chlortolidines, benzidine, dianisidine (4,4'-diamino-3,3'-dimethoxy-diphenyl), 6,chlor-o-tolidine from 6-chlor-2-nitrotoluene, and the like.

The additional feature of stage-wise addition of aliquot portions of the caustic or alkali to the reaction mass also result in improved products in these other cases as well as in the case of benzidine and dichlorbenzidine.

The temperatures and conditions indicated in the previous example are what we have found to be optimum reaction conditions for the equipment and quantities of material which such plant is capable of handling. It is also clear from experimental work that different reaction periods may be employed than those indicated which are optimum for the equipment and quantities employed.

Other modes of applying the principle of this invention may be employed instead of those specifically set forth above, changes being made as regards the details herein disclosed, provided the elements set forth in any of the following claims, or the equivalent of such be employed.

We, therefore, particularly point out and distinctly claim as our invention:

1. The process of manufacturing compounds of the benzidine series, which comprises reducing a nitro-substituted aromatic ring compound having a position para to a nitro group unsubstituted in the presence of hydrogen and an aqueous solution of an alkali metal hydroxide at a temperature of from about 65° C. to about 100° C., shock-cooling the reaction mass to a temperature to below about 20° C., substantially neutralizing the reaction mass with a mineral acid, separating the hydrazoaromatic product, and rearranging said product by means of a mineral acid at a temperature of from about 20° C. to about 90° C., diluting the rearranged mass with from 1 to 10 volumes of water, and recovering the rearranged product therefrom.

2. The process of manufacturing compounds of the benzidine series, which comprises reducing a nitro-substituted aromatic ring compound having the general formula:

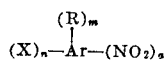

wherein Ar is an aromatic nucleus, R is selected from the group consisting of hydrogen and aliphatic radicals, X is halogen and $m$ and $n$ are each selected from the group consisting of zero and a small whole number from 1 to the number of available replaceable hydrogen atoms on the aromatic nucleus less 1 plus the value of $a$ which is at least 1, and having a position para to a nitro group unsubstituted in the presence of finely divided zinc and an aqueous solution of an alkali metal hydroxide at a temperature of from about 65° C. to about 100° C., shock-cooling the reaction mass to a temperature to below about 20° C., substantially neutralizing the reaction mass with a mineral acid, separating the hydrazoaromatic product, and rearranging said product by means of a mineral acid at a temperature of from about 20° C. to about 90° C., diluting the rearranged mass with from 1 to 10 volumes of water, and recovering the rearranged product therefrom.

3. The process of manufacturing compounds of the benzidine series, which comprises reducing a nitro-substituted aromatic ring compound having a position para to a nitro group unsubstituted in the presence of zinc and an aqueous solution of an alkali metal hydroxide at a temperature of from about 65° C. to about 100° C., said zinc being added slowly to the reaction mass as 50% to 80% aqueous slurry, shock-cooling the reaction mass to a temperature to below about 20° C., substantially neutralizing the reaction mass with a mineral acid, separating the hydrazoaromatic product; and rearranging said product by means of a mineral acid at a temperature of from about 20° C. to about 90° C., diluting the rearranged mass with from 1 to 10 volumes of water, and recovering the rearranged product therefrom.

4. The process of manufacturing compounds of the benzidine series which comprises reducing a nitro-substituted aromatic ring compound having a position para to a nitro group unsubstituted in the presence of finely divided zinc and an aqueous solution of an alkali metal hydroxide at a temperature of from about 65° C. to about 100° C., said aqueous solution alkali metal hydroxide being slowly added to the reaction mass in substantially equal portions, the first of such portions being added prior to the addition of any zinc metal, and the remaining portions added from time to time during the addition of said metal, shock-cooling the reaction mass to a temperature below about 20° C., substantially neutralizing the reaction mass with a mineral acid, separating the hydrazoaromatic product, and rearranging said product by means of a mineral acid at a temperature of from about 60° C. to about 70° C., diluting the rearranged mass with from 1 to 10 volumes of water, and recovering the rearranged product therefrom.

5. The process of manufacturing compounds of the benzidine series, which comprises reducing a nitro-substituted aromatic ring compound having a position para to a nitro group unsubstituted in the presence of finely divided zinc and an aqueous solution of an alkali metal hydroxide at a temperature of from about 65° C. to about 100° C., said finely divided zinc being added slowly to the reaction mass as a 50% to 80% aqueous slurry, said aqueous solution of an alkali metal hydroxide being slowly added to the reaction mass in substantially equal portions, the first of such portions being added prior to the addition of any zinc, and the remaining portions added from time to time during the addition of said catalyst, shock-cooling the reaction mass to a temperature below about 20° C., substantially neutralizing the reaction mass with a mineral acid, separating the hydrazoaromatic product, and rearranging said product by means of a mineral acid at a temperature of from about 20° C. to about 90° C., diluting the rearranged mass with from 1 to 10 volumes of water, and recovering the rearranged product therefrom.

6. The process of manufacturing compounds of the benzidine series which comprises heating a nitro-substituted aromatic ring compound having a position para to a nitro group unsubstituted to a temperature of about 80° C., adding ⅓ portion of an approximately 30% aqueous solution of an alkali metal hydroxide, introducing finely divided zinc at the rate of about 20% of the weight of such metal per hour while maintaining the temperature between about 80° and 90° C., adding a second aliquot portion of the aqueous solution of alkali metal hydroxide after about 10% of the zinc has been added, and the third aliquot portion after about ½ of the zinc has been added, reducing the temperature by about 10 to 20 degrees, adding an additional amount of finely divided zinc at the rate of about 20% by weight of the metal per hour at the reduced temperature, agitating the reaction mass for a period of about 1 hour after the addition of the metallic catalyst has been completed while maintaining the temperature to at least about 70° C., shock-cooling the reaction mass to a temperature below about 20° C., substantially neutralizing the reaction mass with a mineral acid, separating the hydrazoaromatic product from the reaction liquor, and rearranging said product by treating the latter with a mineral acid which has been cooled to about 10° C., said rearrangement occurring at a temperature of from about 20 to about 90° C., diluting the rearranged mass with from 1 to 10 volumes of water, agitating for a period of from about .5 to 1 hour, and recovering the rearranged product therefrom.

7. A process in accordance with claim 1 in which the nitro-substituted aromatic ring compound is o-nitro chlorbenzene.

8. A process in accordance with claim 1 in which the nitro-substituted aromatic ring compound is o-nitro toluene.

9. A process in accordance with claim 1 in which the aqueous solution of an alkali metal hydroxide is an aqueous solution of sodium hydroxide.

10. The process of manufacturing compounds of the benzidine series which comprises heating a mono-nitro substituted benzene ring compound having a position para to the nitro group unsubstituted to a temperature of about 80° C., adding a ⅓ portion of an approximately 30% aqueous solution of an alkali metal hydroxide, introducing finely divided zinc at the rate of about 20% of the weight of such metal per hour while maintaining the temperature between about 80°-90° C., adding a second aliquot portion of the aqueous solution of alkali metal hydroxide after about 10% of the zinc has been added, and the third aliquot portion after about ½ of the zinc has been added, reducing the temperature by about 10 to 20 degrees, adding an additional amount of finely divided zinc at the rate of about 20% by weight of the metal per hour at the reduced temperature, agitating the reaction mass for a period of about 1 hour after the addition of the metallic catalyst has been completed while maintaining the temperature to at least about 70° C., shock-cooling the reaction mass to a temperature below about 20° C., substantially neutralizing the reaction mass with a mineral acid, separating the hydrazoaromatic product from the reaction liquor, and rearranging said product by treating the latter with a mineral acid which has been cooled to about 10° C., said rearrangement occurring at a temperature of from about 20 to about 90° C., diluting the rearranged mass with from 1 to 10 volumes of water, agitating for a period of from about .5 to 1 hour, and recovering the rearranged product therefrom.

11. A process in accordance with claim 10 in which the mono-nitro substituted benzene ring compound is o-nitro chlorbenzene.

12. A process in accordance with claim 10 in which the mono-nitro substituted benzene ring compound is o-nitro toluene.

13. A process in accordance with claim 10 in which the mono-nitro substituted benzene ring compound is o-nitro chlorbenzene, and the alkali metal hydroxide is sodium hydroxide.

MARTIN DONALD FARKAS.
JEROME DEICH.

References Cited in the file of this patent

Snyder et al., of A. C. S., vol. 71, pp. 289–291, January 1949.

Lukashevich, Chemical Abstracts, vol. 29, p. 2527³ (1935).